US007957825B2

(12) United States Patent
Marsh et al.

(10) Patent No.: US 7,957,825 B2
(45) Date of Patent: *Jun. 7, 2011

(54) SPLICING FUSELAGE SECTIONS WITHOUT SHIMS

(75) Inventors: Bobby J. Marsh, Lake Stevens, WA (US); Kinson D. VanScotter, Stanwood, WA (US); Karen Malen-Hogle, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/835,941

(22) Filed: Jul. 14, 2010

(65) Prior Publication Data

US 2010/0280648 A1    Nov. 4, 2010

Related U.S. Application Data

(62) Division of application No. 11/685,934, filed on Mar. 14, 2007, now Pat. No. 7,787,979.

(51) Int. Cl.
*G06F 19/00* (2011.01)
(52) U.S. Cl. ........ 700/119; 700/117; 700/118; 700/195; 702/105
(58) Field of Classification Search .................... 29/428; 700/117, 118, 119; 702/105; 356/601, 625
See application file for complete search history.

(56) References Cited

U.S. PATENT DOCUMENTS

| 4,642,900 | A  | * | 2/1987  | Provost et al. ............. 33/606 |
|-----------|----|---|---------|------------------------------------|
| 4,945,488 | A  | * | 7/1990  | Carver et al. ............. 700/182 |
| 5,289,267 | A  | * | 2/1994  | Busch et al. ............. 356/394  |
| 5,649,888 | A  | * | 7/1997  | Micale et al. ............. 483/11  |
| 6,230,382 | B1 | * | 5/2001  | Cunningham et al. ....... 29/407.1  |
| 6,618,505 | B2 | * | 9/2003  | Cork et al. ............. 382/190   |
| 2001/0046323 | A1 | * | 11/2001 | Cork et al. ............. 382/203 |
| 2008/0110275 | A1 | * | 5/2008  | Odendahl ............. 73/780      |

* cited by examiner

*Primary Examiner* — Michael D Masinick
(74) *Attorney, Agent, or Firm* — Tung & Associates

(57) ABSTRACT

Fuselage sections of an aircraft are joined using splice elements that compensate for gaps caused by mismatches between mating surfaces on the fuselage sections. The fuselage sections are virtually assembled using computer models that are based on non-contact measurements of as-built fuselage sections. The virtually assembled fuselage sections are used to map the gaps between the mating surfaces. The mapped gaps are used to produce tool inserts having profiles that reflect the dimensions of the gaps. The tool inserts are used to manufacture splice elements having profiles that fill the gaps when the fuselage sections are assembled and joined, thereby eliminating the need for shims and spaces to fill the gaps.

11 Claims, 4 Drawing Sheets

SPLICING FUSELAGE SECTIONS WITHOUT SHIMS

This is a Divisional of an application Ser. No. 11/685,934, filed on Mar. 14, 2007 now U.S. Pat. No. 7,787,979.

TECHNICAL FIELD

This disclosure generally relates to methods for assembling fuselage sections of aircraft, and deals more particularly with a method for assembling the fuselage sections using splice elements that compensate for gaps in mismatched surfaces between the fuselage sections.

BACKGROUND

The fuselage of large commercial aircraft is often manufactured by fitting and joining cylindrical fuselage sections sometimes referred to as "barrels". The fuselage sections are assembled together using splice straps and splice elements that span the joint between the sections. Because of accumulated manufacturing variations in parts forming each section, sometimes referred to as tolerance stacking, small mismatches between mating surfaces of the fuselage sections create gaps that must be filled with shims or spacers. In the past, in order to determine the size and location of the gaps, the fuselage sections were fitted together and held in place using jigs or fixtures. Based on this preliminary "fit", the gaps were measured and custom parts, spacers or shims were machined to fill the gaps.

Shims add parasitic weight to the aircraft, and are both time consuming and expensive to manufacture, since each shim is unique and must be machined to size by skilled craftsman. Furthermore, the process of physically fitting the fuselage sections together, determining the dimensions of the needed shims and then manufacturing the shims must be performed in a serial manner, all in a critical path of the manufacturing process. As a result, the shimming process adds to factory flow time.

Accordingly, there is a need for a method of assembling fuselage sections that eliminates the requirement for spacers and shims to fill gaps in mismatched, mating surfaces. Embodiments of the disclosure are directed toward satisfying this need.

SUMMARY

Illustrated embodiments of the disclosure provide a method for assembling fuselage sections of aircraft that eliminate the need for shims, spacers and other special parts to fill gaps between mating surfaces of the two sections. The elimination of shims and spacers reduces the weight of the aircraft as well as the time required for measuring surface mismatches, and fabricating/installing custom parts to compensate for these mismatches.

In accordance with one embodiment, a method is provided for assembling two fuselage sections of an aircraft. The method comprises the steps of: measuring the position of mating surfaces of the fuselage sections; virtually assembling the fuselage sections; generating the profile of splice elements used to join the fuselage sections based on the virtual assembly; producing a tool insert based on the splice element profile; producing splice elements using the tool insert; and, assembling the fuselage sections using the splice elements. The position of the mating surfaces of the two fuselage sections is preferably measured using non-contact measurement techniques, such as photogrammetry and/or laser tracking. Virtual assembly of the fuselage sections is performed using computer generated models of the two sections and comparing the computer models to identify gaps between mating surfaces of the sections. The tool insert may be produced using any of several solid free-form fabrication techniques, including three dimensional ink jet printing. The tool insert has a profile that is transferred to the splice element and compensates for mismatches between mating surfaces of the fuselage sections. The resulting splice element has a profile that fills the gaps caused by the mating surface mismatches. The splice elements may be formed by placing the tool insert into a tool base, introducing uncured material into the tool in contact with the insert, curing the material and removing the splice element from the tool. The uncured material is produced by forming a lay-up including multiple plies of fiber reinforced resin, and drawing the lay-up against the tool insert by applying a vacuum or other force.

According to another disclosed embodiment, a method is provided for manufacturing a splice element used to assemble fuselage sections of an aircraft. The method comprises the steps of: determining the position of mating surfaces of the fuselage sections in a common coordinate system; determining the profile of a splice element by generating a virtual fit between the fuselage sections; producing a tool based on the profile of the splice element; and, forming the splice element using the tool. The tool may be produced by providing a tool base, providing a tool insert and introducing the tool insert into the tool base. The tool insert possesses a profile complementing the profile of the splice element, and may be manufactured using computer automated, solid free-form fabrication techniques.

According to another embodiment, splice elements are provided for use in joining fuselage sections of an aircraft. The splice elements are manufactured by the steps comprising: generating computer models of the fuselage sections; mapping gaps between the mating surfaces of the fuselage sections using the computer models; generating profiles of splice elements respectively filling the mapped gaps; producing tool inserts having profiles respectively based on the profiles of the splice elements; and, forming the splice elements using the tool inserts.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
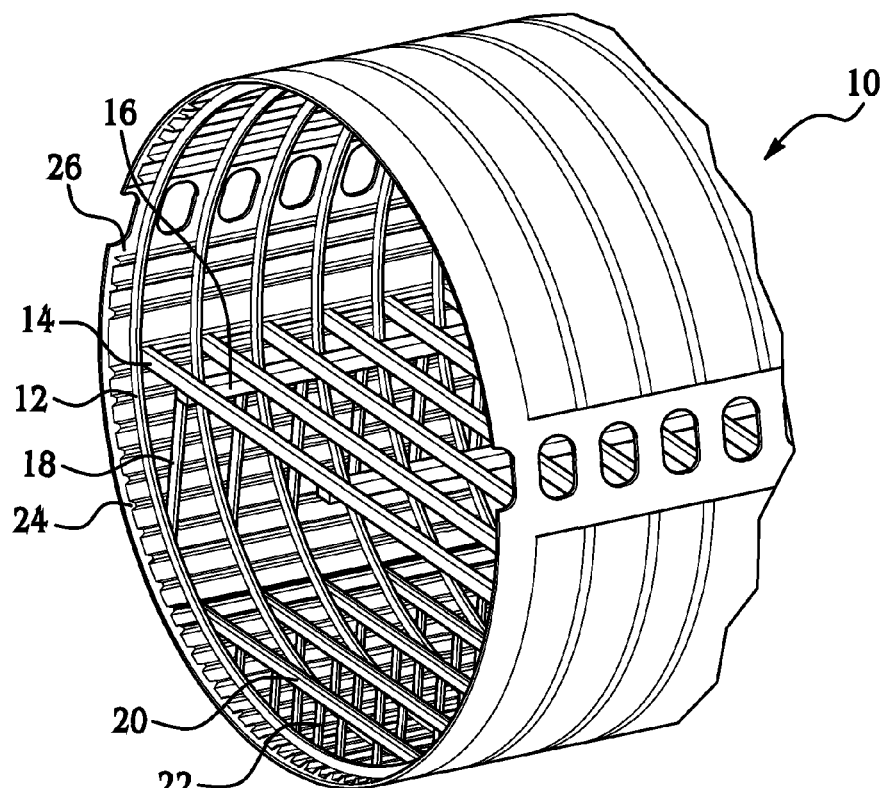
FIG. 1 is a perspective illustration of a fuselage section of an aircraft.

FIG. 1 illustrates a typical fuselage section 10 of an aircraft. The fuselage section 10 includes an inner super-structure formed of various beams, supports and reinforcements. In the illustrated example, this super-structure is formed by circumferentially extending ribs 12 to which there are attached transversally extending beams 14 that are fastened to longitudinally extended beams 16 to form an upper floor normally supporting the passenger cabin. Struts 18 may be provided to aid in supporting the floor formed by beams 14, 16. A lower floor may also be provided to support a baggage compartment, comprising transversally extending beams 20 supported by struts 22 connected to the circumferential ribs 12.

An outer skin 26 is secured to the circumferential ribs 12 and includes longitudinally extending stringers 24. The outer edge of the skin 26 extends slightly beyond an outermost rib 12 and is intended to be fitted to the skin 26 formed around an adjacent fuselage section, as will become later apparent.

Figure 2:
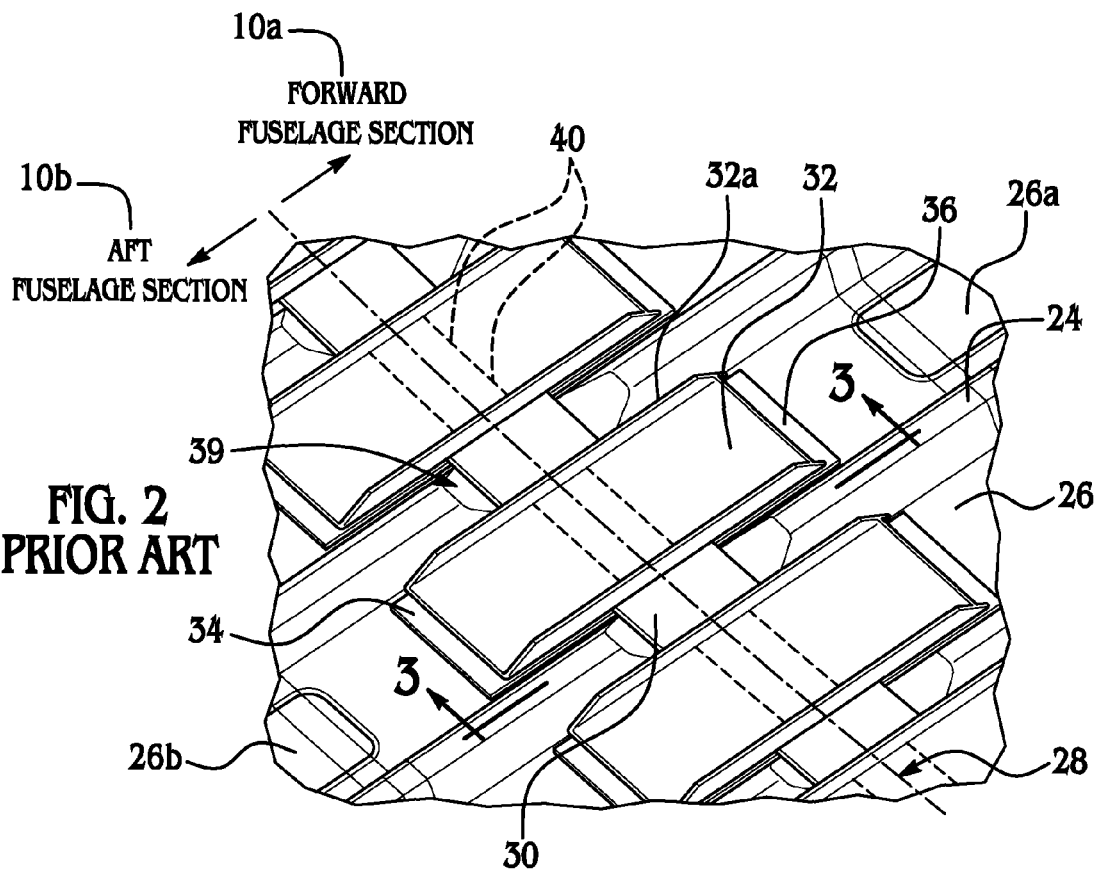
FIG. 2 is a perspective illustration of a portion of a joint formed between two fuselage sections using shims and spacers according to the prior art.
Figure 3:
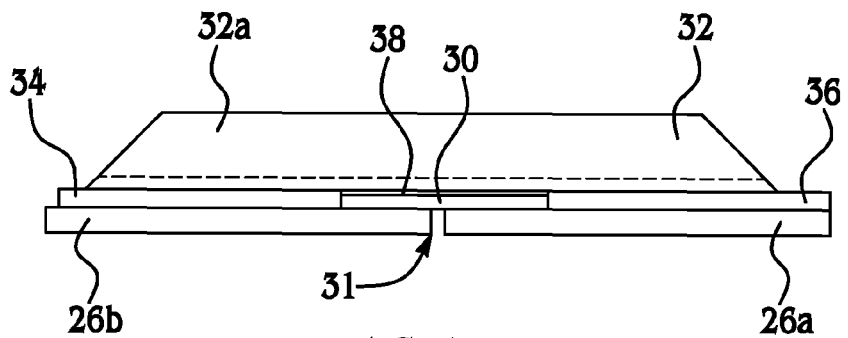
FIG. 3 is a sectional illustration taken along the line 3-3 in FIG. 2.
Figure 4:
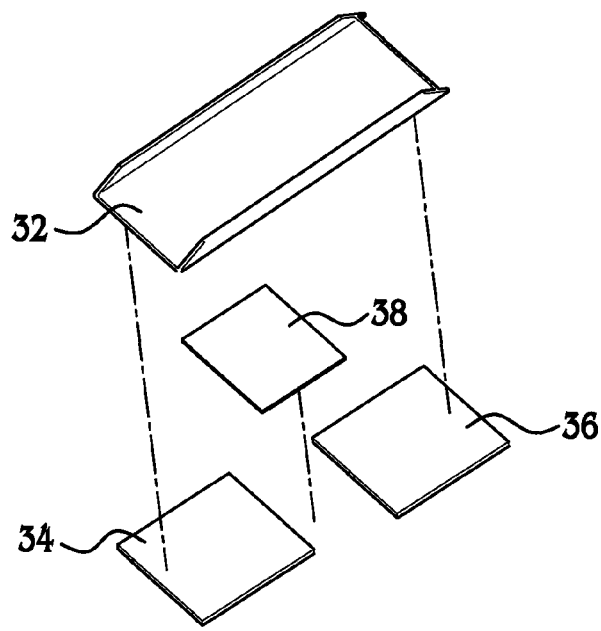
FIG. 4 is an exploded, perspective illustration showing the relationship between a splice channel, and shims and spacers used in the prior art joint assembly shown in FIGS. 2 and 3.

FIGS. 2, 3 and 4 illustrate a prior art method of assembling two adjacent fuselage sections, for example a forward fuselage section 10a and an aft fuselage section 10b. The outer skins 26a, 26b of the respective fuselage sections 10a, 10b are joined along a circumferential joint indicated at 28 in FIG. 2. A circumferentially extending splice strap 30 passes through tapered openings 39 in the stringers 24. The splice strap 30 overlaps adjacent portions of the skin sections 26a, 26b and covers the joint 31 between these two adjoining skin sections. A plurality of splice channels 32 are respectively disposed between adjoining stringers 24 and cover portions of the splice strap 30. Each of the splice channels 32 has a generally flat bottom and a pair of spaced apart reinforcement ribs 32a. The splice strap 30 and the splice channels 32 are secured to the outer skin sections 26a, 26b using fasteners 40, such as rivets.

As a result of normal variations in manufacturing processes and tolerance stacking, mating surfaces of the two fuselage sections 10a, 10b may not be perfectly aligned, resulting in possible gaps between the inner face of the skin sections 26a, 26b and the bottom face of the splice channel 32. Moreover, the alignment mismatch between skin sections 26a, 26b may result in a gap between the splice channel 32 and the splice strap 30. In order to fill the gaps mentioned above, fore and aft spacers 34, 36 respectively, as well as a center shim 38 are provided to fill these gaps, as best seen in FIGS. 3 and 4.

Figure 5:
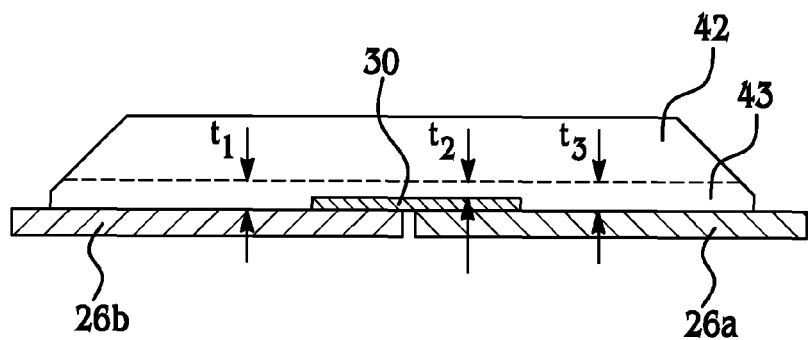
FIG. 5 is an illustration similar to FIG. 3 but depicting the use of a splice element made in accordance with embodiments of the disclosure.

Referring now to FIG. 5, in accordance with an embodiment of the invention, a splice element 42 is provided having a bottom profile tailored so as to fill any gaps that might otherwise be present between the splice element 42 and skin sections 26a, 26b, thereby obviating the need for shims or spacers. As will be discussed later in more detail, a method of manufacturing the splice element 42 is provided which results in thicknesses $t_1$, $t_2$, $t_3$ of the base 43 of the spliced element 42 that varies in accordance with the mismatch between outer skin sections 26a, 26b. In other words, the cross sectional profile of the base 43 of the splice element 42 is precisely tailored to match the underlying surfaces defined by skin sections 26a, 26b and the splice strap 30.

Figure 6:
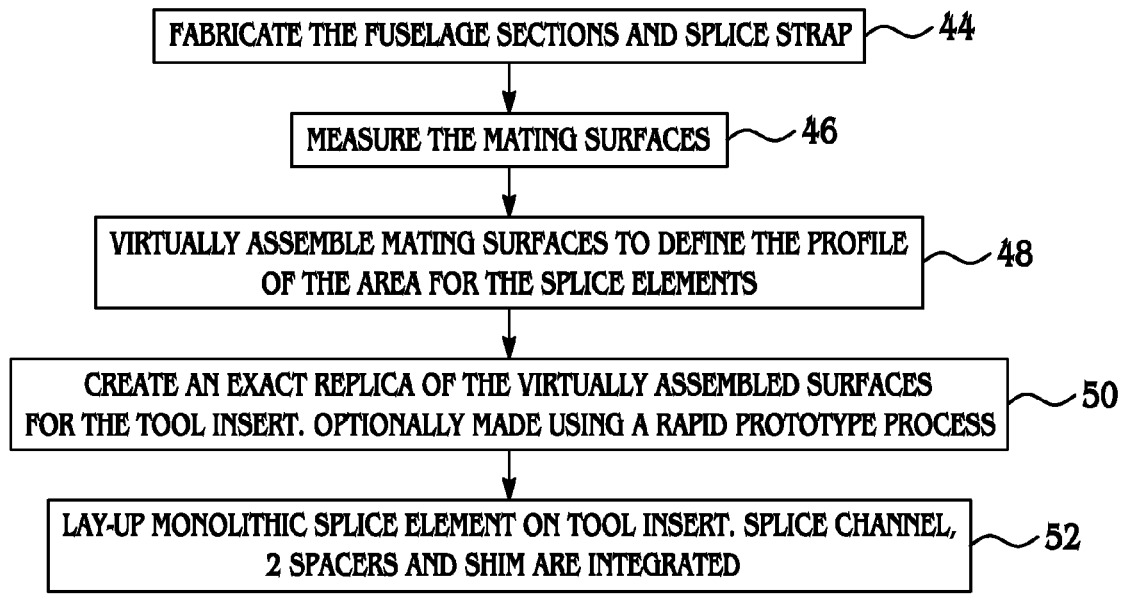
FIG. 6 is a simplified flow diagram illustrating the steps of a method for splicing fuselage sections.
Figure 7:
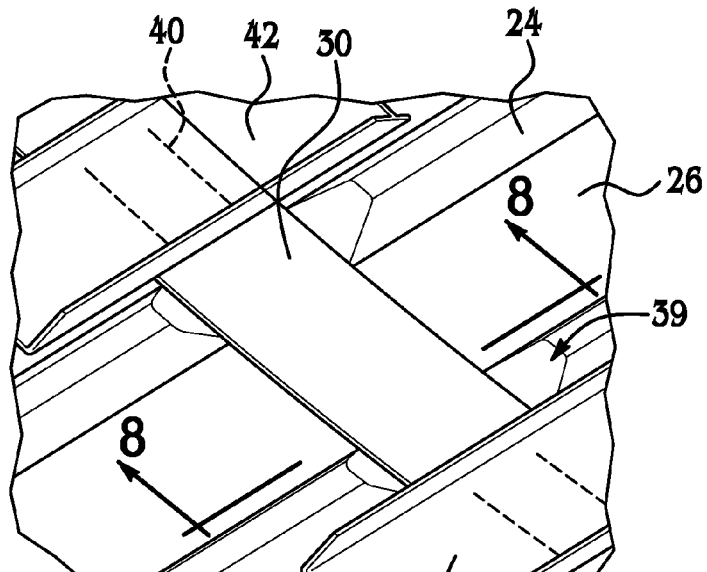
FIG. 7 is a perspective view of a joint formed between two fuselage sections before the installation of a splice element.
Figure 8:
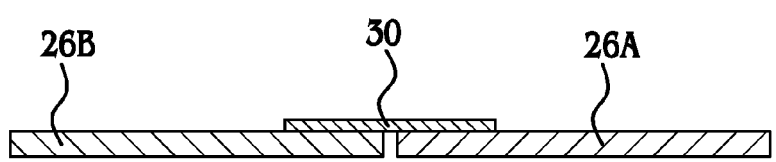
FIG. 8 is a sectional view taken along the line 8-8 in FIG. 7.

Referring now concurrently to FIGS. 5-12, the first step in the method of making the splice element 42 is shown at 44 in FIG. 6 in which the fuselage sections 10 and splice strap 30 are fabricated. Next, at step 46, the fuselage sections 10 are individually measured, preferably using non-contact measurement techniques such as laser scanning and/or photogrammetry. For example, a merged photogrammetry/laser tracking technique can be used to measure the features on each of the fuselage sections 10. Briefly, the merged photogrammetry/laser tracking technique involves measuring surfaces on the fuselage sections 10 utilizing photogrammetry and measuring these surfaces using laser tracking. Data is then generated that represents the position of one or more cameras used in the photogrammetry measurements. The generated position data is spatially linked to the photogrammetry measurements with the laser tracking measurements.

Using the measurement method described above, digital files are created that establish the relative positions of features on the fuselage sections 10 in a common coordinate system. Using these digital files, the fuselage sections 10 may be virtually assembled, without the need for actual physical assembly. Thus, for example the relative spatial positions of features on the fuselage sections 10 can be measured while the sections 10 are in two completely different geographic locations, and the digital files can be forwarded to a third geographic location where they are used to generate a computer model showing the relative positions of mating surfaces of the two fuselage sections 10. At step 48, the fuselage sections are virtually assembled so that the position of the mating surfaces defines the profile of the area for the splice elements 42. In effect, this virtual assembly process maps the size and location of gaps that will be filled by tailoring the profile of the spliced elements 42 to precisely match the mating surfaces on the fuselage sections 10.

The exact dimensions of the gaps requiring tailoring of the profile of the tool insert 54 may be determined using a technique for automatically determining shim dimensions. Briefly, this technique involves measuring the location of a first set of features on one fuselage section 10 and measuring the location of a second set of features on a second fuselage section 10. Next, a virtual fit is generated between the two fuselage sections 10 based on the location measurements. Then, dimensions are generated of shims to be positioned between the two fuselage section 10 based on the generated virtual fit. Feature location measurement may be performed using both laser tracker and photogrammetry processes as described earlier. Generating the virtual fit may include performing a virtual nominal fit and then optimizing the virtual nominal fit. The virtual fit may be performed using computer models of the two fuselage sections and then comparing the computer models to determine the shape of voids requiring shims.

Figure 9:
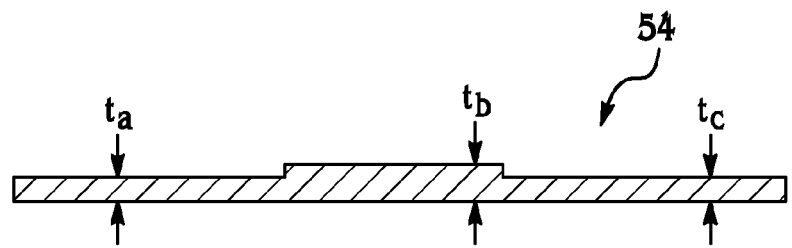
FIG. 9 is a side illustration of a tool insert.
Figure 10:
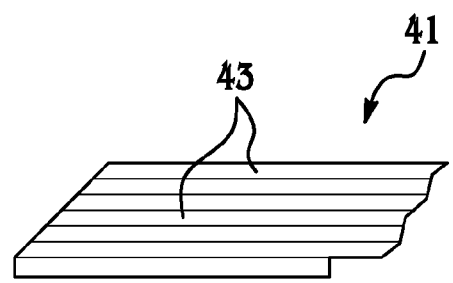
FIG. 10 is a fragmentary, side illustration of a lay-up used to produce a splice element.
Figure 11:
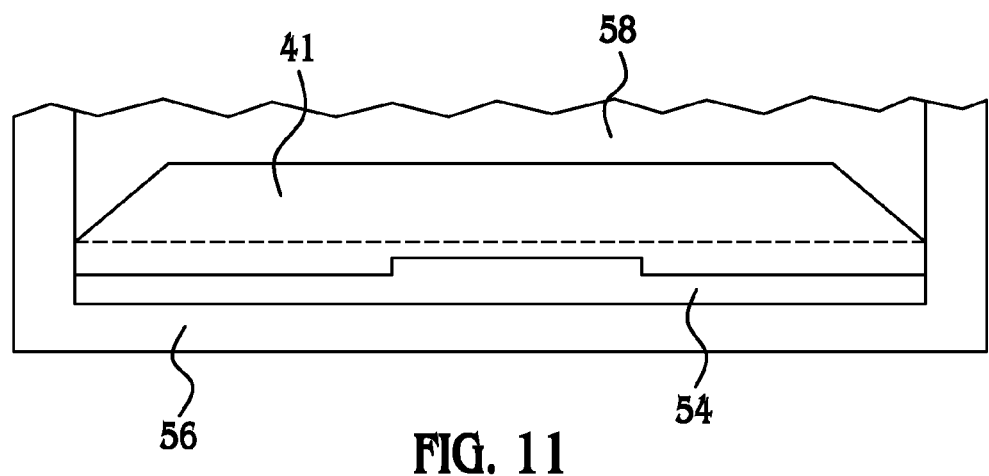
FIG. 11 is a side illustration of a tool assembly containing a tool insert and a lay-up used to produce the splice element.

At step 50, an exact replica of the virtually assembled surfaces is created which is then used to produce a tool insert 54. The tool insert, as best seen in FIG. 9, possesses a cross sectional profile which essentially matches the gaps that have been mapped between mating surfaces of the fuselage sections, in step 48. Thus, the tool insert 54 has varying thicknesses $t_a$, $t_b$, $t_c$ which are the equivalent thicknesses of shims and spacers that would otherwise be needed in the absence of a splice element 42 having a customized profile. The tool insert 54 may be manufactured using a variety of techniques, including machining a solid piece of material. However, in one preferred embodiment, the tool insert 54 is manufactured using computer automated, solid free-form fabrication techniques.

Examples of such solid free-form fabrication include stereolithography, fused deposition modeling and 3-D ink jet printing. In 3-D ink jet printing, parts are built on a platform situated in a bin filled with powder material. An ink jet printing head selectively deposits or "prints" a binder fluid to fuse the powder together in the desired areas. Unbound powder remains to support the part. The platform is lowered, more powder is added and leveled, and the process is repeated, all under automated computer control. When finished, the green part is removed from the unbound powder and excess unbound powder is blown off. The finished part is infiltrated with wax, glue or other sealants to improve durability and surface finish.

Figure 12:
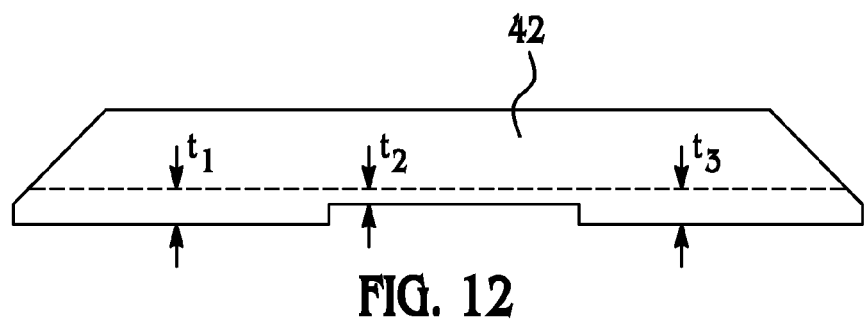
FIG. 12 is a side illustration of a finished splice element manufactured using the tool assembly shown in FIG. 11.

The last step in the method is shown at 52 in FIG. 6, in which the splice element is fabricated by placing a monolithic splice element lay-up over the tool insert so as to impart the profile of the tool insert into the lay-up. This manufacturing step is shown in more detail in FIGS. 10 and 11. A lay-up 41 comprising multiple plies of a fiber reinforced synthetic resin, such as carbon fiber reinforced epoxy resin, is laid up so that the plies 43 are roughly tailored to match the final shape of the splice element 42. Next, the tool insert 54 is placed in a tool base 56. A vacuum bag 58 is placed over the tool base 56 and a vacuum is drawn within the bag 58 which forces the lay-up 41 down onto the tool insert 54 so that the profile of the tool insert 54 is imparted to the lay-up 51. The lay-up 51 and tool assembly may also be placed in an autoclave (not shown) if desired, and then subjected to elevated temperature to cure the uncured or partially cured resin. Following curing, the completed splice element 42 shown in FIG. 12 is removed from the tool base 56 and then is placed over the splice strap 30 and skin sections 26a, 26b shown in FIGS. 7 and 8. Finally, rivets or other fasteners 40 are used to secure the splice element 42 to the splice strap 30 and the fuselage skin sections 26a, 26b.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of manufacturing an aircraft having a plurality of fuselage sections joined together by splice elements, comprising the steps of:
   (A) determining the position of mating surfaces of the fuselage sections in a common coordinate system, said determining comprising a merged photogrammetry and laser tracking process;
   (B) determining the profiles of splice elements by generating a virtual fit between the fuselage sections said determining comprising determining the shape of voids between the virtually fitted fuselage sections;
   (C) producing tools based on the profiles generated in step (C);
   (D) forming the splice elements using the tools produced in step (D); and
   (E) joining the fuselage sections together using the splice elements formed in step (D).

2. The method of claim 1, wherein step (B) is performed by generating computer models of the fuselage sections and comparing the computer models.

3. The method of claim 1, wherein step (C) includes:
   providing a tool base,
   providing a tool insert,
   introducing the tool insert into the tool base.

4. The method of claim 1, wherein step (C) includes manufacturing a tool insert having a profile complementally matching the profile of a splice element.

5. The method of claim 1, wherein step (C) includes manufacturing a tool insert using computer automated, solid free-form fabrication.

6. The method of claim 1, wherein step (D) includes:
   forming a multi-ply lay-up of carbon fiber reinforced synthetic resin,
   placing the lay-up in the tool, and
   forcing the lay-up against the tool to impart the profile to the lay-up.

7. An aircraft manufactured by the method of claim 1.

8. Splice elements used to join fuselage sections of an aircraft, manufactured by the steps comprising:
   (A) generating computer models of the fuselage sections including measuring the spatial location of features on the fuselage sections in a common coordinate system, said measuring comprising a merged photogrammetry and laser tracking process;
   (B) mapping gaps between mating surfaces of the fuselage sections using the computer models generated in step (A) said gaps determined by generating a virtual fit between the fuselage sections;
   (C) generating profiles of splice elements respectively filling the gaps mapped in step (B);
   (D) producing tool inserts having profiles respectively based the profiles generated in step (C); and,
   (E) forming the splice elements using the tool inserts produced in step (D).

9. The splice elements of claim 8, wherein, wherein step (D) is performed using computer automated, solid free-form fabrication.

10. The splice elements of claim 9, wherein the solid free form fabrication is performed by three dimensional ink-jet printing.

11. The splice elements of claim 8, wherein the spliced elements formed in step (E) are each produced by:
   providing tool base,
   placing a tool insert into the tool base,
   introducing a multi-ply lay-up of reinforced synthetic resin material into the tool base, and
   forcing the lay-up against the tool insert to impart the profile of the tool insert into the lay-up.

* * * * *